(12) United States Patent
Braun et al.

(10) Patent No.: US 9,969,359 B2
(45) Date of Patent: May 15, 2018

(54) WIPING MEMBER MADE FROM A MATERIAL BASED ON OVER-CROSSLINKED ELASTOMER(S)

(75) Inventors: Alexis Braun, Coudes (FR); Frédéric Bretagnol, Issoire (FR); Severin Doupeux, Issoire (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 956 days.

(21) Appl. No.: 13/993,123

(22) PCT Filed: Dec. 14, 2011

(86) PCT No.: PCT/EP2011/072761
§ 371 (c)(1),
(2), (4) Date: Jul. 11, 2013

(87) PCT Pub. No.: WO2012/080337
PCT Pub. Date: Jun. 21, 2012

(65) Prior Publication Data
US 2013/0283559 A1 Oct. 31, 2013

(30) Foreign Application Priority Data
Dec. 15, 2010 (FR) ...................................... 10 04903

(51) Int. Cl.
*B05D 3/06* (2006.01)
*B60S 1/38* (2006.01)
*C08J 7/12* (2006.01)

(52) U.S. Cl.
CPC ................ *B60S 1/38* (2013.01); *B05D 3/068* (2013.01); *B60S 1/3848* (2013.01); *C08J 7/123* (2013.01); *B60S 2001/3829* (2013.01); *B60S 2001/3898* (2013.01)

(58) Field of Classification Search
None
See application file for complete search history.

(56) References Cited

U.S. PATENT DOCUMENTS

| | | | |
|---|---|---|---|
| 5,883,168 A | 3/1999 | Oulie | |
| 6,287,642 B1 | 9/2001 | Leutsch et al. | |
| 2002/0164422 A1 | 11/2002 | Burger et al. | |

(Continued)

FOREIGN PATENT DOCUMENTS

| | | |
|---|---|---|
| CA | 2607647 A1 | 2/2009 |
| EP | 0 264 227 A2 | 4/1988 |

(Continued)

OTHER PUBLICATIONS

English language machine translation of JP 2010-535268A, Nov. 2010.*

(Continued)

*Primary Examiner* — Ramsey E Zacharia
(74) *Attorney, Agent, or Firm* — Osha Liang LLP

(57) ABSTRACT

The invention relates to a wiping member (10) comprising an elastomer-based material, a coating being provided on at least part of an external surface of the material. At least part of the surface of the assembly formed by the elastomer-based material and the coating has an increased degree of cross-linking over at least one surface thickness of the assembly. The invention also relates to a windshield wiper blade and to a method for treating a wiping member.

6 Claims, 2 Drawing Sheets

(56) References Cited

U.S. PATENT DOCUMENTS

| | | |
|---|---|---|
| 2006/0042745 A1 | 3/2006 | Kim et al. |
| 2008/0016644 A1* | 1/2008 | Mizote .................... B60S 1/38 15/250.361 |
| 2008/0178610 A1 | 7/2008 | Whitcher et al. |

FOREIGN PATENT DOCUMENTS

| | | |
|---|---|---|
| EP | 2067833 A1 | 6/2009 |
| FR | 2 899 242 A1 | 10/2007 |
| JP | 2002506487 A | 2/2002 |
| JP | 2003534410 A | 11/2003 |
| JP | 2004518809 A | 6/2004 |
| JP | 2005520732 A | 7/2005 |
| JP | 2009067233 A | 4/2009 |
| JP | 2010535268 A | 11/2010 |
| WO | 2009043743 A1 | 4/2009 |
| WO | 2009053186 A1 | 4/2009 |
| WO | 2010100384 A1 | 9/2010 |
| WO | 2012080322 A1 | 6/2012 |

OTHER PUBLICATIONS

Office Action in corresponding Chinese Patent Application No. 201180067664.4 dated Mar. 16, 2015, with translation (16 pages).
International Search Report issued in PCT/EP2011/072761 dated Feb. 3, 2012 (4 pages).
Office Action Issued in Corresponding Japanese Application No. 2013-543758, dated Mar. 29, 2016 (11 Pages with English Translation).
Third Party Observation issued in corresponding European Application No. EP20110794777, mailed on Nov. 22, 2016 (4 pages).
Office Action issued in corresponding Mexican Application No. MX/a/2013/006879, dated May 26, 2015 (4 pages).
Office Action issued in corresponding Mexican Application No. MX/a/2013/006879, dated Jul. 22, 2016 (5 pages).

* cited by examiner

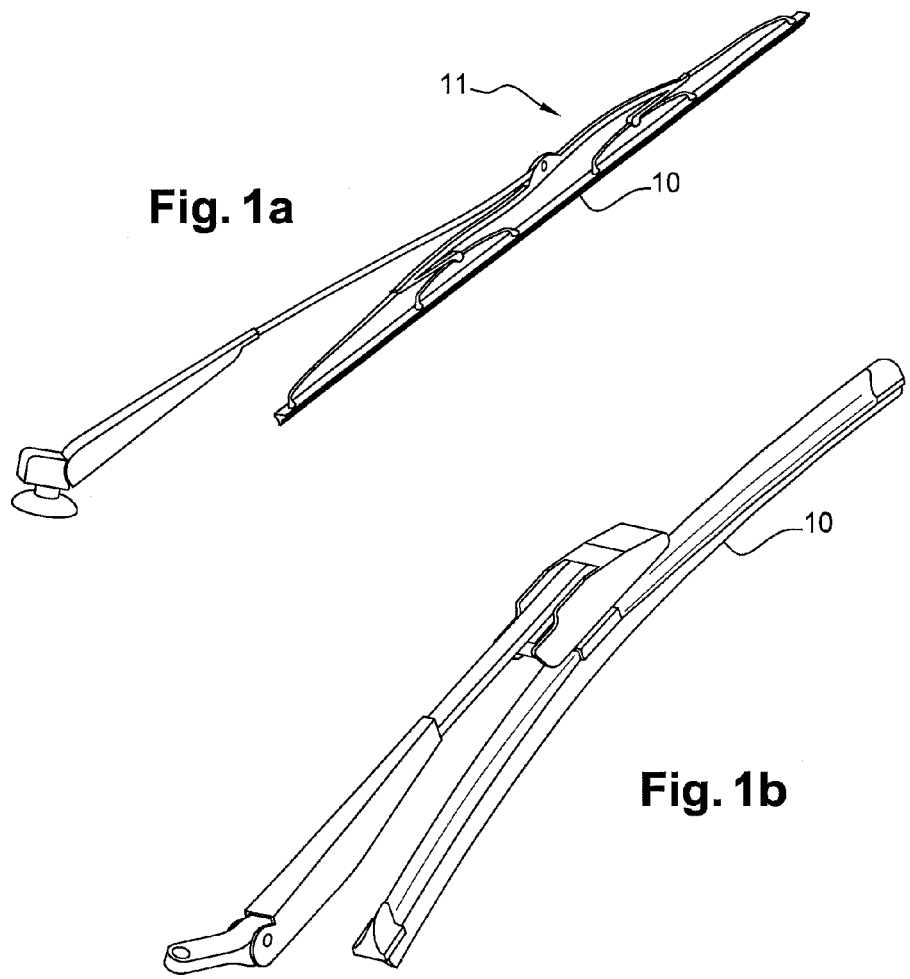
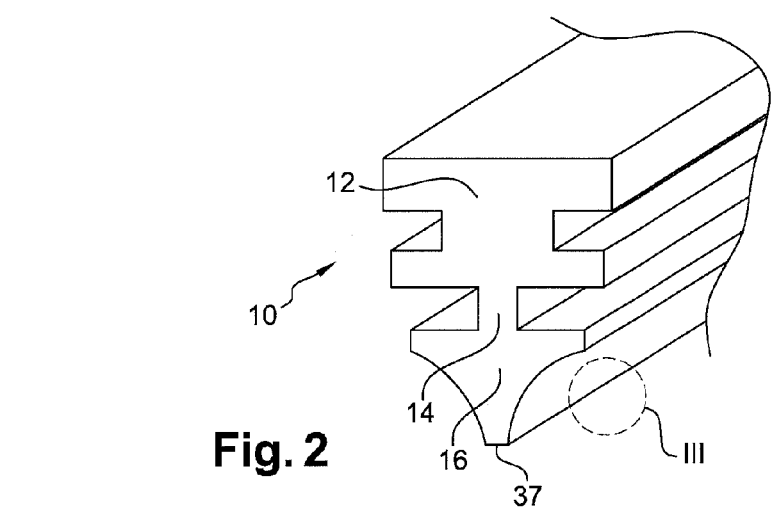

WIPING MEMBER MADE FROM A MATERIAL BASED ON OVER-CROSSLINKED ELASTOMER(S)

The present invention relates to a wiping member for a surface to be wiped, in particular a windshield wiper blade for a motor vehicle, the member comprising a material based on elastomer(s) having a specific surface treatment. The invention also relates to a process for obtaining this member and to the use thereof.

In the field of technical materials based on elastomers, the research often targets an improvement in the mechanical properties and/or in the surface appearance of the parts formed from these materials.

In the case of wiping blades for a motor vehicle windshield wiper, these blades must have certain characteristics, in particular at the surface, enabling an effective wiping of the windshield over which they move. These blades must also have sound comfort in use for the occupant of the motor vehicle, that is to say must avoid generating sound waves, and therefore noise.

In order to resolve this problem, it has been proposed to treat the surface of the wiper blades.

A first type of treatment is a halogenation of the blade which makes it possible to increase the service life of the blade. However, this type of treatment has the drawback of not being very environmentally friendly (e.g.: consumption of water, of sodium hydroxide, etc.). Moreover, the halogen atoms which are covalently bonded to the elastomer, in particular by nucleophilic addition to the unsaturated groups of the carbon-based chains, give the surface of the material a more hydrophilic nature that tends to capture water, which may give rise to a slight mist during their operation and therefore reduce the visibility of the driver of the vehicle. Finally, halogenation cannot always be carried out on elastomers that have no or few unsaturated groups in their carbon-based chains, such as silicones or EPDM rubbers.

A second type of treatment concerns the deposition of a coating based on graphite or on particles of polymers of polytetrafluoroethylene (PTFE, for example sold under the brand Teflon®), polyethylene or polypropylene type, in order to reduce the friction of the blade over the surface to be wiped. However, this coating may, with time, present problems of adhesion to the material, in particular when the latter is based on elastomer(s). This is because the stresses undergone by the blade during its operation create a deterioration of the coating, and more particularly of its adhesion to the material, thus greatly reducing the wiping efficiency and the service life of the blade.

The present invention therefore relates to a wiping member comprising a material based on elastomer(s) that is treated so as to resolve these problems.

It therefore relates to a wiping member comprising a material based on elastomer(s) comprising a coating on at least one portion of an outer surface of the material, at least one portion of the surface of the assembly constituted by the material based on elastomer(s) and the coating having an increased crosslinking over at least a superficial thickness of the assembly.

The definitions and preferences explained in detail below are applicable to the entire patent application.

The expression "based on" is understood to mean a material comprising at least 10% of elastomer(s), preferably at least 20%, more preferably at least 35%.

The term "elastomer(s)" is understood to mean a polymer having "hyperelastic" properties, obtained after crosslinking of the polymer. These elastomers include natural or synthetic elastomers, alone or as a blend, in particular the elastomers chosen from the group consisting of natural rubbers (NRs), polychloroprenes (CRs), ethylene-propylene-diene monomers (EPDMs), nitrile rubbers (NBRs, HNBRs, XNBRs), polybutadienes (BRs), butyl rubbers, epichlorohydrins (ECOs/GECOs), ethylene-acrylate copolymers (VAMAC type), polyurethanes (PUs), fluoroelastomers and silicone elastomers (VMQs/FMQs). These elastomers may be used alone or as a blend. By way of example, mention is made of the NR/EPDM, NR/CR or EPDM/PP blends or of other blends known to a person skilled in the art.

Preferably, the elastomers are chosen from the group consisting of NRs, EPDMs and CRs and blends based on these elastomers.

Specifically, the material comprises at least one synthetic or natural base elastomer, and also various fillers and/or additives in order to ensure its mechanical performances and its compatibility with varied climatic environments.

The fillers used are generally carbon black, graphite, silica, talc or a chalk and also the derivatives and/or mixtures thereof.

The additives comprise, inter alia, protective agents, for example derivatives of para-phenylenediamines which trap UV rays. The additives also include waxes which migrate to the surface in order to protect the material. Furthermore, the additives may include plasticizers for improving the cold resistance and processing of the elastomer. The plasticizers most commonly used are naphthenic oil, aromatic oil, paraffinic oil or ester oil. The additives include a vulcanization system, for example comprising sulfur and/or various molecules that improve the efficiency of the reaction or derivatives of peroxides.

Thus, a coating comprising at least one binder and/or at least one filler is deposited on the elastomer-based material. This coating makes it possible to reduce the friction between the wiping member and the surface to be wiped and therefore to maintain the wiping quality of the wiper for a longer time. By way of example, the coating used may be that defined in the example from patent U.S. Pat. No. 5,883,168.

The binder or binders comprise a polymer, the role of which is to retain the fillers, such as graphite or other lubricating particles, on the wiping member. It is incorporated in the form of a suspension, dispersion or powder depending on the method of application of the coating. The polymer of the binder is chosen from acrylic derivatives, acrylic styrene derivatives, acrylonitriles and derivatives thereof, polyurethanes of ester or ether type and derivatives thereof and polyvinyl chloride (PVC). The binder may also comprise a fluoroelastomer, silicones or siloxanes, elastomeric latices, and powders of polyamide, of polyethylene or of polypropylene. The binder may also comprise a crosslinking agent of melamine, isocyanate or epoxy type in order to confer increased mechanical strength and chemical resistance properties on the coating and also wax to improve the impermeability of the film formed by the binders.

The filler or fillers make it possible to lower the friction coefficient of the wiping member. Usually, use will be made of graphite, molybdenum disulfide ($MoS_2$), talc, PTFE, particles of ultrahigh molecular weight polyethylene (UHMWPE), polyethylene, polypropylene, silicones, nanostructured fillers such as fullerenes, carbon nanotubes (CNTs) or mixtures thereof.

The incorporation of these fillers into a liquid binder will be facilitated by dispersion agents such as, for example, polyacrylates. Thickeners that prevent their sedimentation are also often required.

Crosslinking is defined as a densification of the bonds between the macromolecular chains constituting the polymer. The expression "increased crosslinking" is understood to mean a degree of crosslinking greater than that of the polymer(s) and/or elastomer(s) present in the remainder of the material and/or coating.

In general, the degree of crosslinking of the polymer(s) and/or elastomer(s) present in the remainder of the material and/or coating will correspond to the degree of crosslinking obtained under the standard vulcanization or chemical crosslinking conditions of the polymer(s) and/or elastomer(s), that is to say without additional specific treatment of the polymer(s) and/or elastomer(s). Use may also be made of the term "over-crosslinked".

For a given polymer, the degree of crosslinking D may be measured by the solubility of the polymer or polymers in a solvent. Since the polymer is soluble in the solvent, the crosslinked parts will themselves be insoluble.

By considering only the mass of the superficial thickness of the polymer:

D=weight of the treated polymer that is insoluble in a solvent/total weight of the polymer.

For example the degree of crosslinking of the NBR may be measured as follows:

D=weight of the NBR that is insoluble in meta-cresol or formic acid/total weight of NBR.

According to one advantageous example, the degree of crosslinking of the elastomer of the member in the superficial thickness is 10% greater than that of the polymer(s) present in the remainder of the elastomer-based material, preferably 50% greater, more preferably 95% greater.

The crosslinking of the material and/or of the coating may also be demonstrated by DSC (differential scanning calorimetry). A comparison of the treated and untreated material/coating demonstrates that the increase in the degree of crosslinking of the material/coating has the effect of making the glass transition temperature "$T_g$" (endothermic change in heat capacity) disappear.

The expression "superficial thickness" is understood to mean a thickness located at the surface of the material. Advantageously, this thickness is less than 5 μm starting from the outer surface of the coating, preferably less than 3 μm, more preferably less than 1 μm. According to another advantageous example, the superficial thickness is equal to or greater than 3 μm and less than 5 μm.

The increased crosslinking of this superficial thickness enables an increase in the hardness and the abrasion resistance in particular of the coating and/or the material. One of the effects of this increase in hardness is to reduce the noise that the member is capable of producing by rubbing on the surface to be wiped. The member according to the invention therefore makes it possible to improve the sound comfort of the vehicle occupant.

Another effect of this increased crosslinking is to increase the abrasion resistance of the member according to the invention and consequently its service life. Furthermore, the superficial thickness having an increased crosslinking forms a barrier which prevents the migration of chemical species, especially the species used in windshield washer or window washer products, toward the inside of the member. However, these chemical species may degrade the coating and/or the material based on elastomer(s).

It should be noted that the outer surface of the material based on elastomer(s) may be partially or completely coated by the coating.

When the material is partially coated by the coating, the material may also be partially or completely treated by ion bombardment.

The invention also describes a wiping member comprising a material based on elastomer(s) that is capable of being obtained by the process comprising the steps consisting in:
    depositing a coating on at least one portion of an outer surface of the material based on elastomer(s),
    treating, by ion bombardment, at least one portion of the surface of the assembly constituted by the material based on elastomer(s) and the coating.

The increased crosslinking is obtained using an ion bombardment of sufficient energy to generate recombinations in the material and increase the covalent links. Crosslinking is obtained, the crosslinking intensity of which is greater than that obtained by other means such as crosslinking using a chemical agent. Furthermore, it is independent of the chemical nature of the polymer to be irradiated. For example, it will be effective both on a silicone-based polymer and on an acrylic polymer or a polyurethane.

By virtue of this ion bombardment treatment of a portion of the outer surface of the assembly constituted by the material based on elastomer(s) and the coating, a wiping member is produced, of which at least one portion of its outer surface is harder over a given thickness and less subject to wear, especially by rubbing. Moreover, this increased crosslinking renders the assembly more resistant to the chemical attacks that may be due to the products used for cleaning the windshields.

Furthermore, the adhesion of the coating to the untreated outer surface is better than the adhesion of the coating to a pretreated outer surface. Indeed, if the ion bombardment treatment were to be carried out before the deposition of the coating, the bombardment would have the effect of reducing the roughness of the outer surface of the material based on elastomer(s) and therefore of reducing the adhesion of the coating to the material.

The ion bombardment treatment is carried out using a device comprising an ion generator and an ion applicator such as, for example, those described in FR-A-2 899 242 or US 2006/0042745.

The ion applicator customarily comprises means chosen, for example, from electrostatic lenses for forming a beam of ions, a diaphragm, a shutter, a collimator, an ion beam analyzer and an ion beam controller.

The ion generator customarily comprises means chosen, for example, from an ionization chamber, a filament ion source or an electron cyclotron resonance ion source or a pulsed plasma system, an ion accelerator and in certain cases an ion separator.

Ion bombardment is generally carried out under vacuum. For example, FR-A-2 899 242 proposes housing all of the ion bombardment means (ion generator and ion applicator) and also the object to be treated in a vacuum chamber. Vacuum means are connected to this chamber. These vacuum means must make it possible to obtain a relatively high vacuum in the chamber, for example of the order of $10^{-2}$ mbar to $10^{-6}$ mbar.

Advantageously, the ion bombardment is carried out using beams of mono-energetic or multi-energetic ions resulting from gases such as helium, neon, krypton, argon, xenon, oxygen or nitrogen, alone or as a mixture. Preferably, nitrogen and/or helium, alone or as a mixture, preferentially nitrogen.

Preferably, the ion bombardment will be carried out at a pressure between 1 mbar and $10^{-5}$ mbar, preferably between $10^{-2}$ mbar and $5\times10^{-4}$ mbar, transmitting to the material an energy of the order of 0.1 to 100 keV, preferably of 0.3 to 30 keV.

According to another advantageous example, the ion bombardment is generally carried out with an extraction voltage of between 35 kV and 100 kV, and between $10^{14}$ and $10^{16}$ ions/cm² are implanted in the material.

Advantageously, the coating comprises a first layer and a second layer, the first layer aiming to enable the adhesion of the second layer and the second layer aiming to reduce the friction.

The first layer is a layer which is deposited on the material based on elastomer(s) whereas the second layer is deposited on the first layer. Thus, the first layer is inserted between the material based on elastomer(s) and the second layer.

This two-layer coating makes it possible to optimize the composition of each of the layers in order to enable a better adhesion of the coating to the material based on elastomer(s) while reducing the friction of the member over the windshield.

For this purpose, the first layer and the second layer each have a general composition which corresponds to that given previously in the definition of the coating.

However, the first layer is a layer comprising a binder and a filler, for which the weight fraction of binder will be relatively high with respect to the weight fraction of the filler so as to guarantee a better adhesion of the first coating layer to the material based on elastomer(s). The ratio of the dry weight of the filler to the dry weight of the binder may, for example, be between 0 and 2, preferably, this ratio is between 1 and 2.

Advantageously, the thickness of the first layer is small in order to promote the penetration of the ion treatment. The purpose of this layer is to generate a surface roughness which will promote the adhesion of the second layer. The thickness of this first layer may be between 1 and 15 µm. Preferably, the thickness is between 1 and 5 µm.

The second layer is a layer comprising a binder and a filler, for which the weight fraction of filler will be relatively high with respect to the weight fraction of binder so as to maximize the performances of reduction of the rubbing actions. The ratio of the dry weight of filler to the dry weight of binder may, for example, be between 3 and 10. Preferably, this ratio is between 4 and 7. More preferably, the ratio is between 5 and 6.

The thickness of the second layer may be between 1 and 15 µm. Preferably, the thickness is between 3 and 10 µm. More preferably, the thickness is between 3 and 7 µm.

Preferably, the binder of the second layer is the same as that of the first layer so as to accentuate the chemical affinity between the two layers. The filler of the second layer may be identical to or different from that of the first layer, depending on the performances targeted. For example, it is possible to use a graphite filler in the first layer and a carbon nanotube (CNT)/graphite mixture in the second layer so that the effect of the CNTs is maximized in view of the amount of CNTs used.

Thus, owing to the optimization of the composition of the second layer, the friction between the wiping member and the surface to be wiped succeeds in being reduced by around 20%.

Advantageously, the first and second layers of the coating of the wiping member are co-crosslinked.

The term "co-crosslinked" is understood to mean the formation of covalent bonds between the macromolecular chains of the polymers of the two layers in contact. Specifically, covalent bonds may form by virtue of the bombarded ions, which may either give the energy needed for the formation of the bond or be implanted by bonding the macromolecular chains of the bonds of the two layers of the coating. This co-crosslinking is therefore an increased crosslinking between the layers of the coating which results from the ion bombardment.

Since the increased crosslinking defined previously is independent of the chemical nature of the polymer, molecular recombinations will be generated within each irradiated layer but also between the polymer chains of the various superposed coating layers. Covalent bonds therefore form between the polymers of the layers of the coating.

A coating is therefore obtained, the layers of which are bonded together by covalent bonds between the macromolecular chains of the polymers of the first and second layers of the coating. Thus, it is ensured that the layers of the coating are firmly attached and do not risk, under the action of the friction forces, being detached from one another.

Advantageously, the filler, for example graphite, is trapped in the binder which is rendered more dense and more cohesive owing to its increased crosslinking. This thus prevents the graphite particles from being torn from the binder under the effect of the friction forces. The service life of the coating is therefore increased.

Moreover, the coating may also be co-crosslinked with the material based on elastomer(s). This co-crosslinking also results from the ion bombardment.

In the same way as for the layers of the coating, the implanted ions may form covalent bonds between the macromolecular chains of the first layer of the coating and the macromolecular chains of the material based on elastomer(s).

Thus, a good anchoring quality of the coating to the material based on elastomer(s) is guaranteed. A member is therefore obtained, the coating of which has a good adhesion to the material based on elastomer(s), is more rigid, and the service life of which is longer than a conventional wiping member.

Wiping members more particularly targeted by the invention are a windshield wiper blade or a window sealing strip lip.

Another subject of the invention is a wiping device comprising a wiping member as defined above. It is more particularly a windshield wiper blade and a window sealing strip, in particular for a motor vehicle.

For example, a wiper blade is usually composed of three elements:
  a lip that provides contact with the windshield and that provides the seal enabling the wiping of the water,
  a heel of generally rectangular shape enabling the blade to be inserted into the wiper, and
  an (optional) hinge formed by a thin strip of rubber located between the lip and the heel and that provides the correct positioning of the lip on the windshield, especially during the change of direction of the wiper at the reversal points.

It should be noted that the wiper may be either a conventional wiper, or a flat wiper.

The expression "conventional wiper" is understood to mean a wiper for which the pressure distribution imparted by the arm supporting the wiper is provided by yokes distributed along the wiper.

Whereas for a "flat wiper" the pressure distribution imparted by the arm supporting the wiper is provided by a metal vertebra having a calculated pressure and curvature. Thus, it is possible to do away with the yokes of the arm, which enables a reduction in the height of the wiper.

The invention also relates to a process for treating a wiping member comprising a material based on elastomer(s) comprising the steps consisting in:
- a) depositing at least one coating on at least one portion of an outer surface of the material based on elastomer(s),
- b) treating, by ion bombardment, a portion of the surface of the assembly constituted by the material based on elastomer(s) and the coating.

Owing to this process, a wiping member is obtained, for which the coating has an increased crosslinking, at least over a superficial thickness, or even a coating co-crosslinked with the material based on elastomer(s).

This ion bombardment treatment may advantageously replace the halogenation treatment customarily used.

In this treatment process, the ion bombardment is as defined above.

The process according to the invention may also comprise a prior step of preparing a pair of wiping members.

This pair, that is to say two wiping members attached together, optionally through a sacrificial central element, is advantageously prepared by molding (injection or compression molding) or by extrusion of the material based on elastomer(s).

The process may also comprise a pre-splitting step carried out between step a) and step b).

The term "pre-splitting" is understood to mean a cutting process that aims to create a continuous notch on either side and along the profiled element constituted of the wiping pair. These notches allow a subsequent separation of the wiping members which may be managed more simply in welded form. They also enable a complete or partial surface treatment of the wiping edge without having to detach the two members of the profiled element.

In other words, when the pair of wiping members has been prepared, a coating is deposited on the outer surface of the material based on elastomer(s) and, before the ion bombardment treatment, the pair is pre-split.

The surfaces of the newly created notches are then treated by ion bombardment, which makes it possible to generate an increased crosslinking over a superficial thickness of the surface of the notches and also a co-crosslinking of the various layers of the coating with one another and with the material based on elastomer(s). It is thus guaranteed that, on the portions of the wiping member that are the most mechanically stressed, the coating layers and the material based on elastomer(s) do not delaminate.

Another subject of the invention is the use of the members as defined above for reducing the noise nuisances that may be produced during the friction of a wiping member with the surface to be wiped.

Specifically, when the wiping member moves over the surface to be wiped, for example over a windshield or against a window, the frictions between the member and the surface to be wiped may generate soundwaves which are detrimental to the comfort of the vehicle occupants.

Advantageously, the members described previously make it possible to reduce these noises.

Specifically, these members deform less under the effect of the friction forces since they are harder at the surface, more resistant to wear and the friction between the member and the surface to be wiped is optimized.

BRIEF DESCRIPTION OF THE DRAWINGS

Other features and advantages of the invention are described in the following examples, given solely by way of nonlimiting example and with reference to the drawings in which:

FIGS. 1a and 1b are schematic perspective views respectively of a conventional windshield wiper and of a flat windshield wiper, FIG. 2 is a schematic perspective view of a wiping blade according to one embodiment of the invention.

FIGS. 1a and 1b represent a schematic perspective view of a conventional windshield wiper 11 or flat windshield wiper 11 comprising a wiping blade 10 according to the invention.

FIG. 2 is a representation of the wiping blade 10 which comprises a heel 12 which makes it possible to insert the blade into a windshield wiper 11. This blade 10 also comprises a lip 16 which provides the contact with the surface to be wiped and a hinge 14 formed by a thin strip of rubber located between the lip 16 and the heel 12. This hinge 14 provides the correct positioning of the lip 16 on the surface to be wiped, in particular during the change of direction of the wiper 11 at the reversal points. The surface to be wiped is, in the present case, a motor vehicle windshield.

Figure 3:
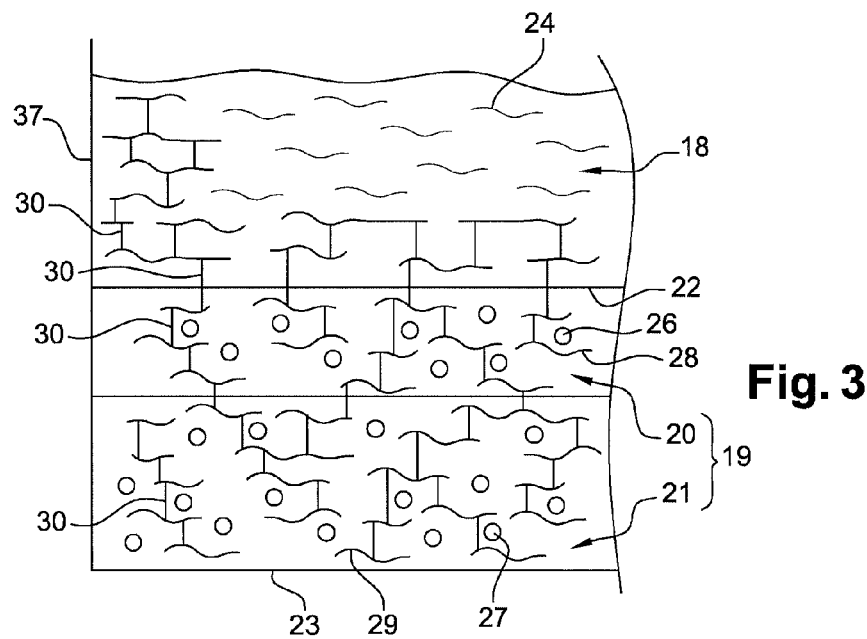
FIG. 3 is an enlargement of the detail III from FIG. 1.

Represented in FIG. 3 is an enlargement of the lip 16 of a wiping blade 10. This lip 16 comprises a material based on elastomer(s) 18 and a coating 19 on its outer surface 22, that is to say the surface of the lip located on the opposite side from the heel 12. The coating has a surface 23 intended to be in contact with the surface to be wiped.

It can be seen that the material based on elastomer(s) 18 comprises macromolecular chains represented by horizontal lines 24. Similarly, the coating 19 comprises, in this example, two layers 20 and 21 each comprising a filler represented by particles 26 and 27 trapped in binder formed of a polymer matrix, the macromolecular chains of which are represented by horizontal lines 28 and 29. The particles 26 and 27 may be of a different nature. Thus, in this example, the particles 26 are graphite particles whereas the particles 27 are a mixture of carbon nanotubes with graphite.

A schematic representation of the increased crosslinking that exists between the macromolecular chains 24, 28 and 29 can also be seen.

The increased crosslinking is, in the present case, carried out by ion bombardment. The ions bombarded may either be implanted by participating in the covalent bonding between the two polymer chains or else merely communicate its energy, which will enable the creation of the covalent bond between the two polymer chains.

This increased crosslinking is therefore due to covalent bonds between macromolecular chains 29 created owing to the ions bombarded. These covalent bonds between the macromolecular chains are represented in FIG. 3 by vertical lines 30. As a function of the parameters of the ion bombardment, covalent bonds 30 may also be formed between the macromolecular chains 28 and between the macromolecular chains 24.

The reader will understand that the macromolecular chains 24, 28 and 29 are not necessarily horizontal chains, that they can be oriented in all directions, criss-cross. Nevertheless, the chains 24, 28 and 29 are not mixed with one another in the sense that they each belong to an independent layer or material before ion bombardment.

This increased crosslinking has the effect of stiffening the member at least over its superficial thickness. It also makes it possible to create a barrier across which the various chemical species cannot migrate, whether from the outside to the inside or from the inside to the outside.

In the layers 20, 21 of the coating, this increased crosslinking makes it possible to create a polymer matrix that is also more dense, which more effectively traps the particles 26 and 27. This makes it possible to reduce the shedding of these particles 26, 27 and therefore the wear of the blade.

When the covalent bonds 30 are created, owing to the ions bombarded, between the macromolecular chains of different layer(s) and material it is then referred to more specifically as co-crosslinking. Covalent bonds are created between macromolecular chains 29 of the second layer 21 of the coating 19 and macromolecular chains 28 of the first layer 20 of the coating 19 and also between macromolecular chains 24 of the material based on elastomer(s) 18 and macromolecular chains 28 of the first layer 20 of the coating 19 through the ions bombarded. These bonds enable a better anchoring of the coating 19 to the material based on elastomer(s) 18 and of the layers 20 and 21 to one another.

A process for treating a pair 32 of wiping blades according to one embodiment of the invention will now be described with reference to FIGS. 4 and 5.

In order to move from one step to the next of this process, the wiping member is, in this example, borne by a conveyor belt that may comprise rollers.

Figure 4:
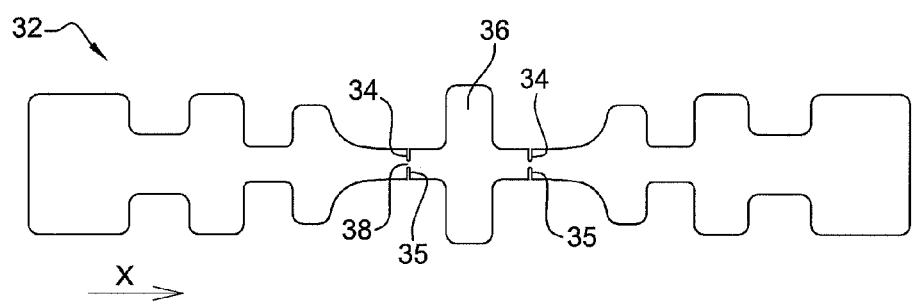
FIG. 4 is a schematic view of a pair of wiping blades.
Figure 5:
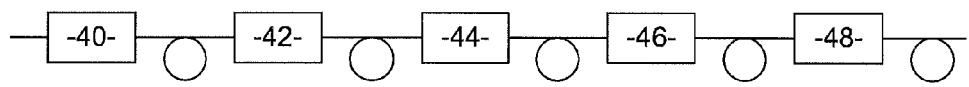
FIG. 5 is a diagram illustrating a process for treating the wiping member according to one embodiment of the invention.

Represented in FIG. 4 is a cross-sectional view of a pair 32 of wiping blades. A transverse axis of central symmetry of the pair, parallel to the axis X is defined. On either side of this axis, two faces of the pair 32 are defined.

This pair 32 may, for example, be obtained by a step of extrusion 40 of material based on elastomer(s). The two blades are extruded together and are attached to one another via the outer surface 22 of the lip 16 through a sacrificial bonding element 36. After vulcanization, a pair 32 of wiping blades 10 made of a material based on elastomer(s) is obtained, but in which the material based on elastomer(s) is raw, that is to say that it has not undergone any post-vulcanization treatment.

Each face of the pair 32 undergoes a step 42 of depositing a coating during which at least one layer of coating 19 that makes it possible to reduce the friction of the wiping blade 10 with the windshield is deposited on a portion of the lips 16 of the wiping blades 10. This coating 19 is deposited in particular at the location where the lip 10 will be pre-split.

The pair 32 then passes to the pre-splitting step 44, that is to say that using a cutting tool, a notch 34, 35 of the pair will be made on each face of the pair, perpendicular to the connection between the lip 16 of each wiping blade 10 and the sacrificial linking element 36 while leaving a portion of this connection uncut. Thus, each blade 10 is connected to the sacrificial linking element 36 by a "bridge" of material 38 which may be easily cut but that is strong enough to enable handling of the pair 32 without the two wiping blades 10 separating.

These notches make it possible to have access to a large portion of the frontal wiping surface 37 of the material based on elastomer(s) 18. Their accuracy may be finely adjusted to within 0.10 mm or even less than 0.05 mm.

More particularly, the pair 32 is continuously notched by putting the pair under tension in order to facilitate the pre-splitting operation. The cutting tool is guided by elements which provide a stable tension and also a reliable guiding of the tool.

A pair 32 is thus obtained in accordance with FIG. 4, in which the notches 34, 35 are in a closed position after cutting and are represented by straight lines and in which it is possible to see the bridge of material 38 connecting each blade 10 to the sacrificial element 36 enabling the pair 32 to be handled as a single element.

In order to treat the edges of the notch 34 and therefore a portion of the frontal wiping surface 37, the pair 32 is positioned so as to place the notches 34 made on one side of the pair 32 in an open position. The ion bombardment is carried out in step 46. In the open position of the notch 34, the walls of the notch 37 form an angle between 20° and 60°, preferably this angle is 45°.

This opening of the notches 34 is achieved owing to the particular shape of the support over which the pair 32 advances.

The angle formed by the walls of the notches and the angle of the beam of ions make it possible to treat, by ion bombardment, a portion of the frontal wiping face 37 and also a portion of the surface of the assembly formed by the material based on elastomer(s) 18 and coating 19 as can be seen in FIG. 3. An increased crosslinking is therefore generated over a superficial thickness between the macromolecular chains of the various layers of the coating and of the material based on elastomer(s) but also over a superficial thickness of the frontal wiping surface 37. This increased crosslinking makes it possible to guarantee good cohesion of the layers 20, 21 of the coating with one another and with the material based on elastomer(s) 18.

When the first face has been treated by ion bombardment, the pair is turned over and the second face is positioned so that the notches 35 of the second face of the pair 32 are in the open position, in which position they may be treated by ion bombardment. The pair 32 is therefore treated over the two faces so that the four notches 34, 35 are treated.

Preferably, the ion bombardment is carried out by placing the sources of ions vertical to the notches 34 with an angle between 0° and 45°, preferably with an angle of 20°.

Moreover, the ion bombardment may be carried out by microsources which may be based, for example, on filament technology or on ECR (electron cyclon resonance) technology with multi-energetic nitrogen ions. Due to their very small size, these microsources make it possible to design a device for which the space requirement is not very big.

The ion bombardment is generally carried out by a succession of sources of ions placed in series in order to obtain the desired treatment intensity as a function of the speed of movement of the pair 32. As a function, in particular, of the conditions for adjusting the sources, the number of sources and the speed of movement of the pair 32, it is possible to implant between $10^{14}$ and $10^{16}$ ions/cm$^2$ in the material. The extraction voltage is between 35 kV and 100 kV.

Finally, in a splitting step 48, each blade 10 is separated from the sacrificial linking element 36 by cutting the bridge of material 38. Two blades 10 are thus obtained comprising a material based on elastomer(s) 18, an outer surface of which is coated at least partly by a coating 20, the material bearing the coating having an increased crosslinking over a superficial thickness.

The invention claimed is:

1. A wiping member comprising a material based on elastomer(s), the wiping member being obtained by a process comprising:
   depositing a coating on at least one portion of an outer surface of the material based on elastomer(s), wherein the coating comprises a first layer and a second layer,
   the first layer is a layer comprising a binder and a filler, for which the ratio of the dry weight of the filler to the dry weight of the binder is between 1 and 2 and the second layer is a layer comprising a binder and a filler, for which the ratio of the dry weight of filler to the dry weight of binder is between 3 and 10; and treating, by ion bombardment carried out using a device comprising an ion generator and an ion applicator, at least one portion of an assembly constituted by the material based on elastomer(s) and the coating, wherein the first layer is disposed between the material based on elastomer(s) and the second layer.

2. The wiping member as claimed in claim 1, wherein the first layer aiming to enable adhesion of the second layer and the second layer aiming to reduce friction.

3. The wiping member as claimed in claim 1, wherein the coating is co-crosslinked with the material based on elastomer(s).

4. The wiping member as claimed in claim 1, wherein the second binder of the second layer is the same as the first binder of the first layer.

5. A method for manufacturing a wiping member as claimed in claim 1, the method comprising:

depositing a coating on at least one portion of an outer surface of a material based on elastomer(s); and treating, by ion bombardment, at least one portion of an assembly constituted by the material based on elastomer(s) and the coating, wherein the coating comprises a first layer and a second layer, wherein covalent bonds being created through said ions bombardment between macromolecular chains of the second layer of the coating and acromolecular chains of a first layer of the coating and between macromolecular chains of the material based on elastomer and macromolecular chains of the first layer of the coating.

6. A wiping member comprising a material based on elastomer(s), the wiping member being obtained by a process comprising:

depositing a coating on at least one portion of an outer surface of the material based on elastomer(s); and treating, by ion bombardment, at least one portion of an assembly constituted by the material based on elastomer(s) and the coating, wherein the coating comprises a first layer and a second layer, the first layer aiming to enable adhesion of the second layer to the material based on elastomer(s) and the second layer aiming to reduce friction, wherein the first layer comprises a first binder and a first filler, wherein a first ratio of a dry weight of the first filler to a dry weight of the first binder is between 1 and 2, and wherein the second layer comprises a second binder and a second filler, wherein a second ratio of a dry weight of the second filler to a dry weight of the second binder is between 3 and 10.

* * * * *